United States Patent [19]
Born et al.

[11] Patent Number: 5,596,551
[45] Date of Patent: Jan. 21, 1997

[54] WATCH COMPRISING AN ARRANGEMENT FOR DETECTING THE DIRECTION OF THE TERRESTRIAL MAGNETIC NORTH

[75] Inventors: Jean-Jacques Born, Morges; Etienne Bornand, Boudry; Rudolf Dinger, St-Aubin, all of Switzerland

[73] Assignee: Asulab S.A., Bienne, Switzerland

[21] Appl. No.: 554,842

[22] Filed: Nov. 7, 1995

[30]   Foreign Application Priority Data

Nov. 21, 1994 [CH] Switzerland ..................... 03495/94

[51] Int. Cl.⁶ .................... G04B 47/00; G01C 9/00
[52] U.S. Cl. .................... 368/10; 368/14; 33/271
[58] Field of Search .................... 368/10, 11, 14, 368/15, 20; 33/271, 355

[56]   References Cited

U.S. PATENT DOCUMENTS

| | | | |
|---|---|---|---|
| 3,545,199 | 12/1970 | Rice | 368/14 |
| 4,183,206 | 1/1980 | Porsche et al. | 368/14 |
| 4,668,100 | 5/1987 | Murakami et al. | 368/10 |
| 4,702,612 | 10/1987 | Finger | 368/10 |
| 5,159,556 | 10/1992 | Schorter | 364/449 |

FOREIGN PATENT DOCUMENTS

| | | |
|---|---|---|
| 469489 | 11/1946 | Belgium . |
| 2404250 | 4/1979 | France . |
| 2438861 | 5/1980 | France . |
| 678359 | 8/1991 | Switzerland . |
| 2151790 | 7/1985 | United Kingdom . |
| 8501805 | 4/1985 | WIPO . |

*Primary Examiner*—Vit W. Miska
*Attorney, Agent, or Firm*—Sughrue, Mion, Zinn, Macpeak & Seas

[57]   ABSTRACT

Watch comprising an arrangement for detecting the direction of the terrestrial magnetic north formed by a permanent magnet and at least two magnetic sensors (34, 36) arranged for detecting the flux of the magnetic field of the magnet. The watch moreover comprises electronic management and control means serving, as a function of the signals coming from the two sensors, to control indicating means (16) arranged so as to indicate either a selected geographic azimuth or the direction of a predefined locality, in particular Mecca.

15 Claims, 8 Drawing Sheets

WATCH COMPRISING AN ARRANGEMENT FOR DETECTING THE DIRECTION OF THE TERRESTRIAL MAGNETIC NORTH

The present invention concerns a watch comprising an arrangement for the detection of the direction of the terrestrial magnetic north. The result of such detection is used in order to indicate either a given geographic direction or the direction of a predefined locality, in particular Mecca.

BACKGROUND OF THE INVENTION

There is known from patent document EP 0 448 018 a compass- watch comprising an electronic horological movement, two magnetic sensors serving to sense directly the terrestrial magn-etic flux, a unit for processing signals furnished by the two magnetic sensors in order to determine the magnetic azimuth of a reference axis of the watch, electronic means for management and control serving to drive display means to a geographic direction and in particular the direction of the geographic north. In order to accomplish this, it is provided that the magnetic declination of the locality where the watch user is located can be furnished through the electronic management and control means in a manner whereby such electronic means can determine the geographic azimuth corresponding to the measured magnetic azimuth.

The prime function of an arrangement having a compass function is to indicate as correctly as possible the direction of the geographic north or of any geographic azimuth whatsoever. In order to accomplish this, in addition to knowing the magnetic declination of the locality of utilization, it is above all necessary, that the means for detecting the direction of the magnetic north be precise and reliable.

The patent document EP 0 448 018 proposes to determine the direction of the magnetic north by using two magnetic sensors, each formed by a magnetic resistance. Such sensors are sensitive to the flux of the terrestrial magnetic field along a preferred direction. Thus, each of the two sensors measures substantially the component of the terrestrial magnetic flux in the region in which such sensor is located, according to the preferred direction. The two sensors are arranged in a manner such that their respective preferred directions are orthogonal. The information received by the two sensors enables the determination of a direction, such direction being interpreted by the electronic management and control means as being the direction of the magnetic north.

The determination of the direction of the magnetic north proposed in the above-mentioned document is delicate and not very reliable. Initially, the direction of the magnetic north, measured with the help of the two magnetic sensors, is dependent on the orientation of the plane defined by the two preferred directions of the two sensors. If the watch user does not maintain the general plane of the watch horizontal, the measure of the direction of the magnetic north is distorted.

Secondly, the terrestrial magnetic field is disturbed by the environment of the magnetic sensors and in particular by the magnetic masses of the electronic horological movement housed within the watch. Such magnetic masses locally deform the terrestrial magnetic flux lines to the extent that the respect-ive components of the terrestrial magnetic flux sensed by the two magnetic sensors do not enable the exact determination of the direction of the terrestrial magnetic north.

Finally, it will be noted that the above-mentioned document gives no information as to the positioning of the two magnetic sensors within the compass watch or of the arrangement used as compass.

The purpose of the present invention is to overcome the above-mentioned drawbacks in furnishing a watch comprising an arrangement for indicating a given geographic direction exhibiting high precision in the determination of the magnetic north.

SUMMARY OF THE INVENTION

To this end, the present invention concerns a watch comprising:
- an horological movement,
- a case in which such horological movement is housed,
- detecting means sensitive to the terrestrial magnetic field and furnishing a first detection signal and a second detection signal,
- means for indicating a geographic direction,
- electronic means for controlling said indicating means as a function of said first and second detection signals.

Such watch is characterized in that the detecting means include a bipolar permanent magnet, rotatably mounted on a shaft arranged in said case so as to turn freely around a predetermined rotation axis, such magnet having a magnetic axis substantially perpendicular to such rotation axis. Such detection means further include at least a first sensor and a second sensor arranged within the case and sensitive to the magnetic field of the permanent magnet, such first and second sensors respectively furnishing said first and second detection signals, said signals being processed by said electronic means in a manner to determine the angular position of the magnetic axis of the permanent magnet.

Thanks to these characteristics, the measurement of the terrestrial magnetic north direction is considerably improved. The permanent magnet naturally positions itself in a minimum energy position and the magnetic axis of such magnet then indic-ates a mean direction of the terrestrial magnetic flux flowing in the region in which the magnet is housed in a plane perpendicular to the axis of rotation.

Given that the magnetic field produced by the permanent magnet in the region neighbouring such magnet is practically un-disturbed, it is easy to determine with high accuracy the direction of the magnetic axis of the magnet with the help of the two sensors arranged in proximity to such magnet. Addition-ally, in contrast to the prior art mentioned hereinbefore, the two sensors are arranged to sense the magnetic flux produced by the permanent magnet, the density of such magnetic flux being substantially greater than the density of the terrestrial magnetic flux in the region neighbouring the permanent magnet. Thereafter, the relative position between such permanent magnet and the two sensors is fixed. Thus, the conditions of measurement are constant in time and in space.

According to a specific characteristic of the invention, the permanent magnet is located within the watch case in a lateral peripheral region exterior to the horological movement contained in such watch. Because of this, the disturbance generated by the presence of the horological movement is minimized and localized.

When the horological movement comprises magnetic masses, as is the case for an electronic horological movement, the permanent magnet is arranged in the case at a sufficient distance from such magnetic masses so that its minimum energy position is basically determined by the terrestrial magnetic flux.

According to other characteristics of the invention, the watch further comprises an information storage unit in which is memorized a correspondence table defining, for a first plurality of angular positions of the magnetic axis of the permanent magnet, a second plurality of respective angular positions, each angular position of the second plurality determining the direction of the magnetic north when the magnetic axis of the permanent magnet is oriented according to the respective angular position of the first plurality. The angular separation between the position of said magnetic axis and the corresponding direction of the magnetic north has a value the magnitude of which is a function of the perturbation generated by the magnetic masses comprised within the watch on the terrestrial magnetic flux in the region in which the permanent magnet is located and on the permanent magnet itself.

According to these latter characteristics of the invention, the determination of the magnetic north direction is freed from the presence of elements comprised within the watch which perturb the terrestrial magnetic flux. Thanks to the correspond-ence table as provided, the direction of the magnetic north ind-icated by the permanent magnet itself can be corrected in a rel-iable manner. In effect, it is possible without further means, to determine the angular separation between any position whatsoever of the magnetic axis of the permanent magnet and the corresponding direction of the magnetic north with the help of a master compass for example. Once the values have been determined for a plurality of different angular positions of the permanent magnet, the perturbation generated by the environment of the permanent magnet is known and well defined. Such perturbation for a given direction of the magnetic axis of the permanent magnet remains substantially invariant in time and space.

There results from these various characteristics of the invention mentioned hereinbefore a watch comprising an arrangement for indicating the direction of the magnetic north which is precise and reliable. Furthermore, it is not necessary, although advantageous, that the general plane of the watch be horizontal when the axis of rotation of the permanent magnet is perpendicular to such general plane of the watch in a preferred embodiment.

Other purposes, characteristics and advantages of the inv-ention will also be described hereinafter with the help of the following description prepared having reference to the annexed drawings given by way of non-limiting examples.

DESCRIPTION OF THE PREFERRED EMBODIMENTS

With the help of FIGS. 1 to 6, there will be described hereinafter a first embodiment of a watch comprising an arrangement for the indication of a geographic direction according to the invention.

Figure 1:
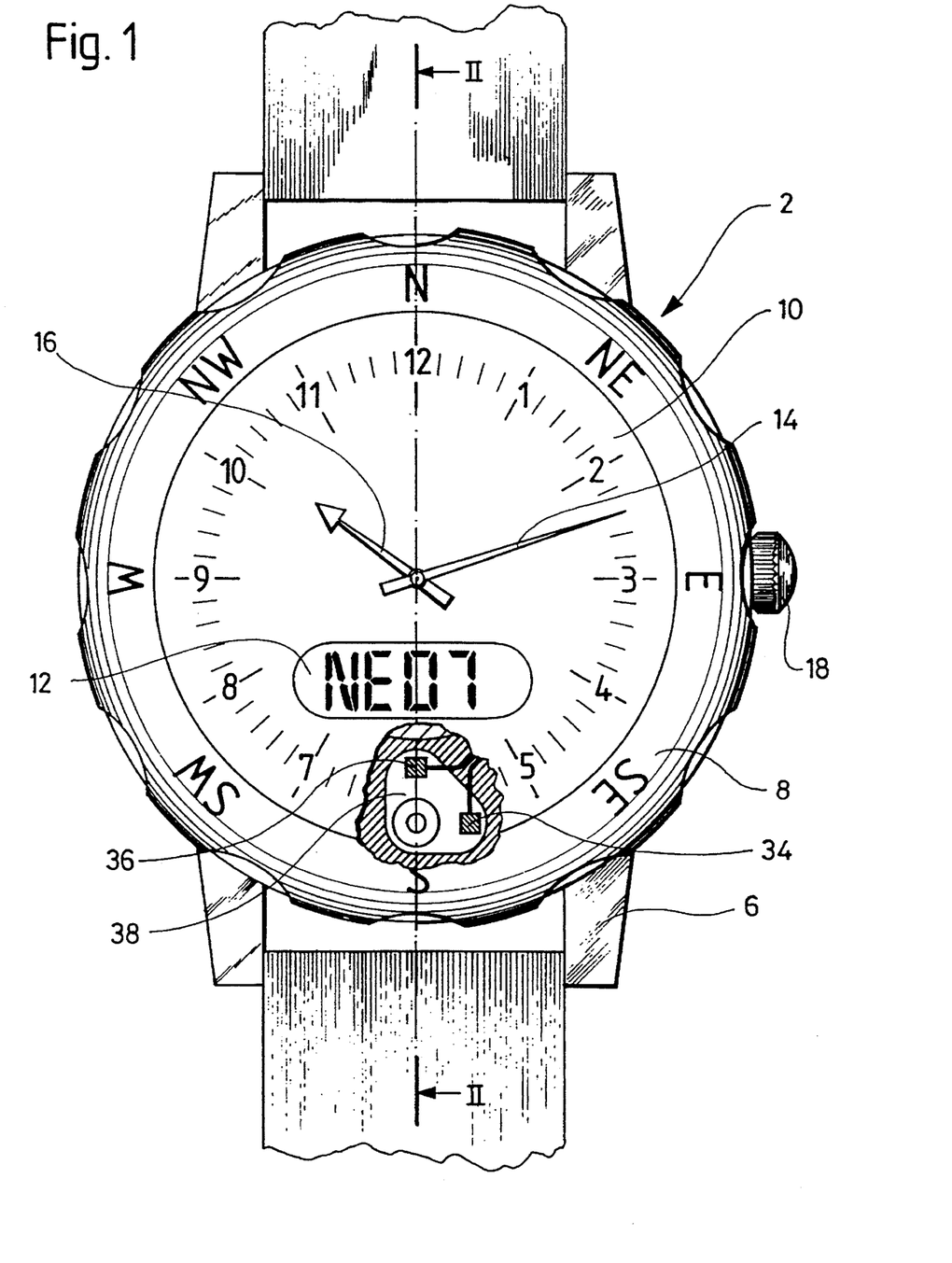
FIG. 1 shows schematically a view from above of a first embodiment of a watch according to the invention, such view comprising a torn-away zone.
Figure 2:
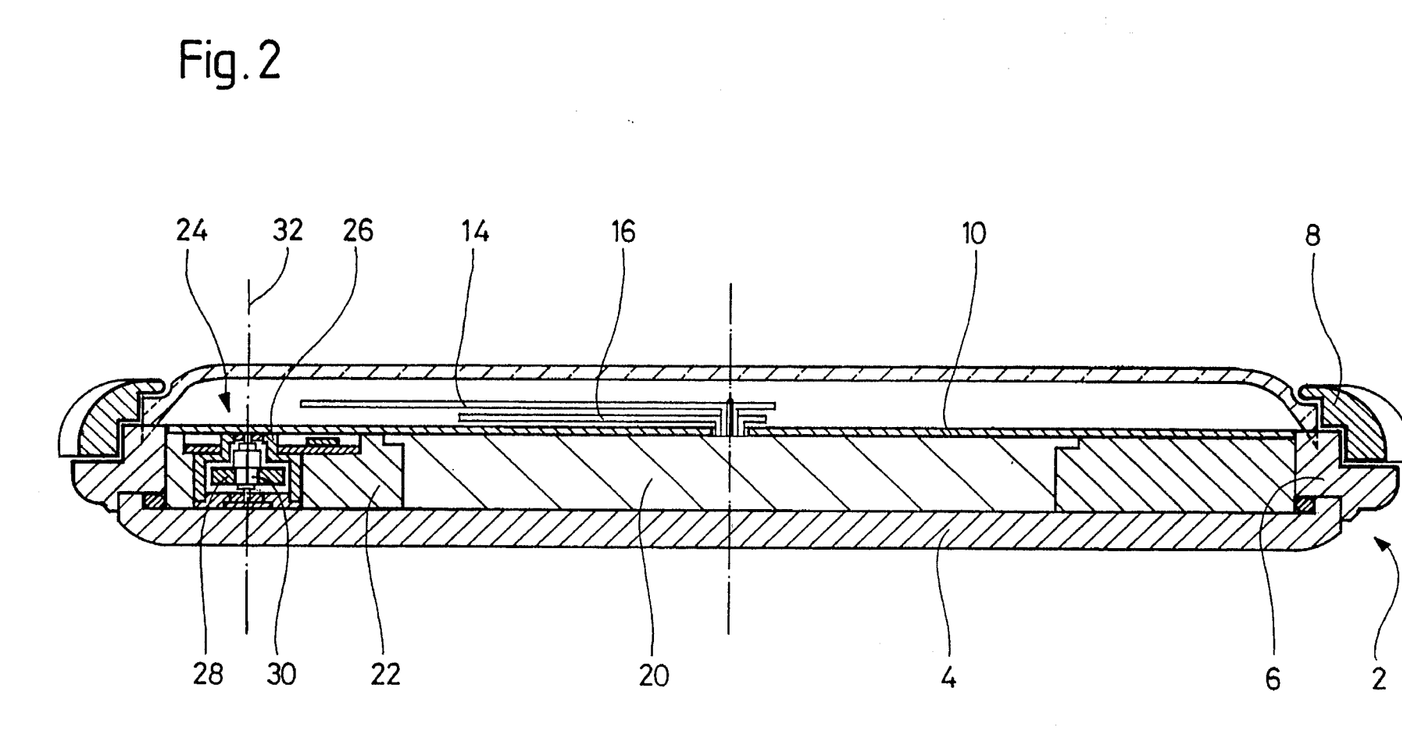
FIG. 2 is a cross-section view according to line II—II of FIG. 1.

The watch comprises a case 2 comprising a back cover 4, a caseband 6 and a turning bezel 8. The watch further comprises a dial 10 on which indications relative to the time of day are displayed. A zone of the dial 10 is reserved for a liquid crystal display 12 (LCD). Such watch additionally comprises a first hand 14 and a second hand 16 as well as a crown 18. Within the case is housed an horological movement 20 positioned within a casing ring 22. In a lateral region 24 of the horological movement 20 is arranged a cage 26 in which is housed a permanent magnet 28 rotatably mounted on a shaft 30 capable of turning freely around a predetermined rotation axis 32. It will be noted that the permanent magnet 28 is located at the exterior of the horological movement 20 and that the rotation axis 32 is perpendicular to the general plane of dial 10.

Figure 3:
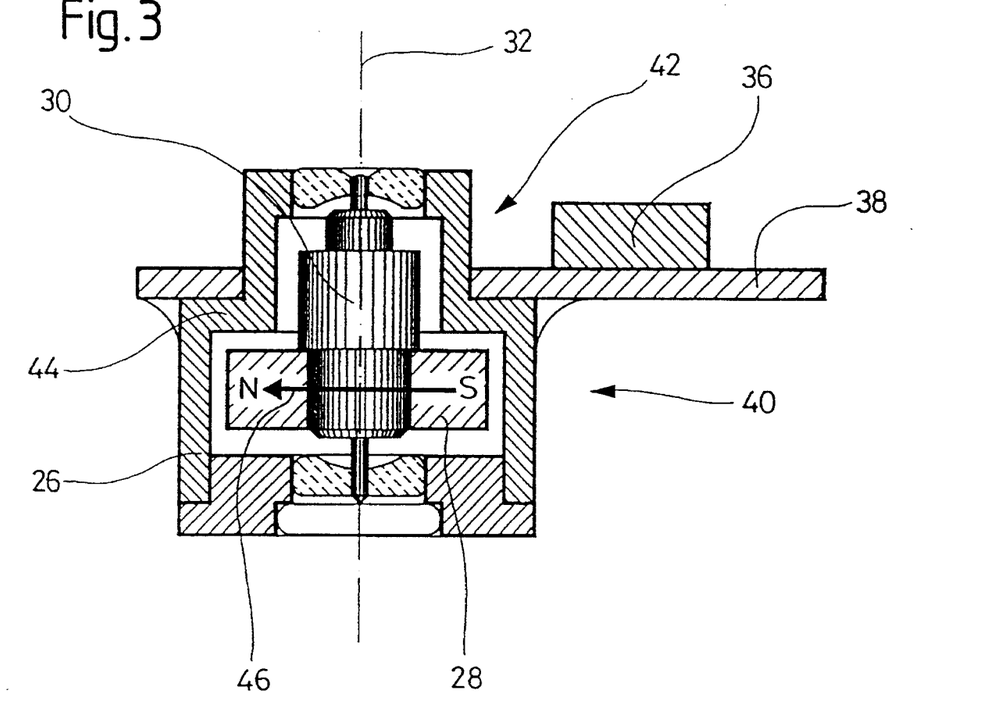
FIG. 3 is an enlarged view of a portion of the watch along the cross-section plane of FIG. 2.

Two magnetic sensors 34 and 36 are also provided, formed for example by two Hall probes, arranged on a common substrate 38. Cage 26 exhibits a first cylindrical portion 40 in the region in which the permanent magnet 28 is housed and a second cylindrical portion 42 of lesser diameter located above the permanent magnet 28. The two cylindrical portions 40 and 42 are coupled by an annular portion 44 defining an external support surface on which substrate 38 is arranged in cantilever.

Substrate 38 is thus located in a plane perpendicular to the rotation axis 32 and it will be noted that sensors 34 and 36 are located at the same distance from the rotation axis 32 and exhibit an angular separation of 90° relative to one another around such rotation axis. Substrate 38 includes an opening having the diameter of the cylindrical portion 42 of cage 26, this latter traversing said opening of the substrate 38 in a manner to correctly position sensors 34 and 36 relative to the permanent magnet 38. In order to maintain substrate 38 bearing against the annular portion 44, it is possible to secure such substrate 38 either to cage 26 or to the casing rings 22 or again by any pressure means whatsoever acting along the direction defined by the rotation axis 32.

Permanent magnet 28 is a bipolar magnet having radial magnetization. Thus, the magnetic axis 46 of such permanent magnet is substantially perpendicular to the rotation axis 32.

Figure 4:
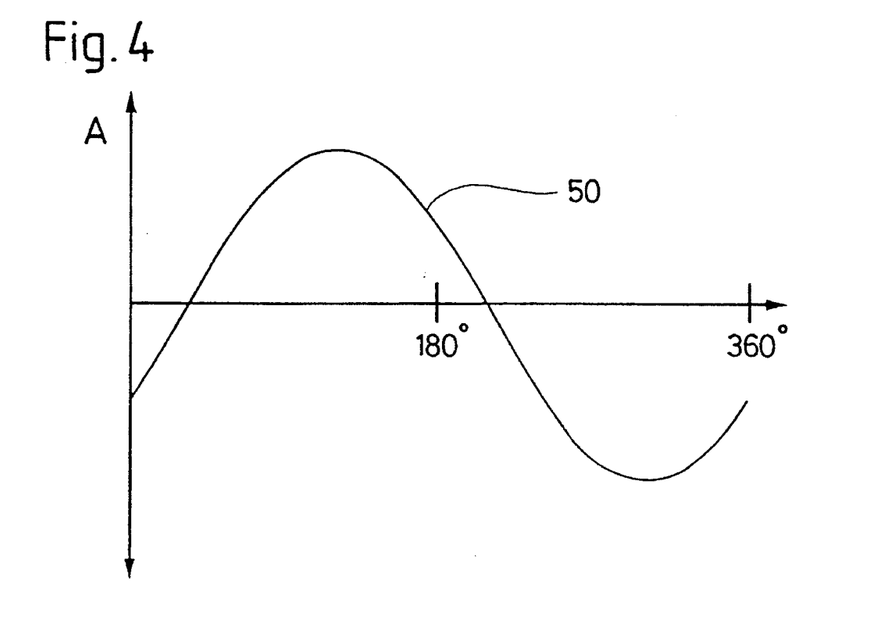
FIG. 4 shows schematically the amplitude of the electrical signal furnished by a Hall probe located proximate a permanent magnet according to the assembly shown in FIG. 3.

On FIG. 4 is graphically shown the amplitude A of the magnetic flux detected by sensor 36 when magnet 28 undergoes a rotation of 360°. It will be noted that the form of curve 50 thus obtained is sinusoidal. Thereby, it is directly possible, with the help of the two sensors 34 and 36, angularly separated by an angle of around 90°, to determine in a precise and unequivocal manner the angular direction of the magnetic axis 46 of magnet 28. Curve 50 shown on FIG. 4 corresponds to an experimental curve measured on an arrangement such as shown on FIG. 3.

The magnetic masses included in the watch, in particular in the electronic movement, form sources of perturbation of the terrestrial magnetic field and are also capable of sensing the flux lines of the magnetic field of the permanent magnet and thus to influence the angular positioning of such permanent magnet 28. In order to overcome these drawbacks and to reduce as much as possible the influence of the above-mentioned magnetic masses, it is provided to arrange the permanent magnet 28 in a peripheral region exterior to the horological movement in a manner such that such magnet is separated as far as possible from the magnetic masses of the horological movement and particularly from those capable of generating a strong perturbation as, for example, the cell serving to power the horological movement.

With the help of relatively simple experimental research, it is possible to define at least one favourable location in the peripheral region mentioned above in which the position of the permanent magnet 28 is basically determined by the terrestrial magnetic flux propagated in the region of such magnet.

Figure 5:
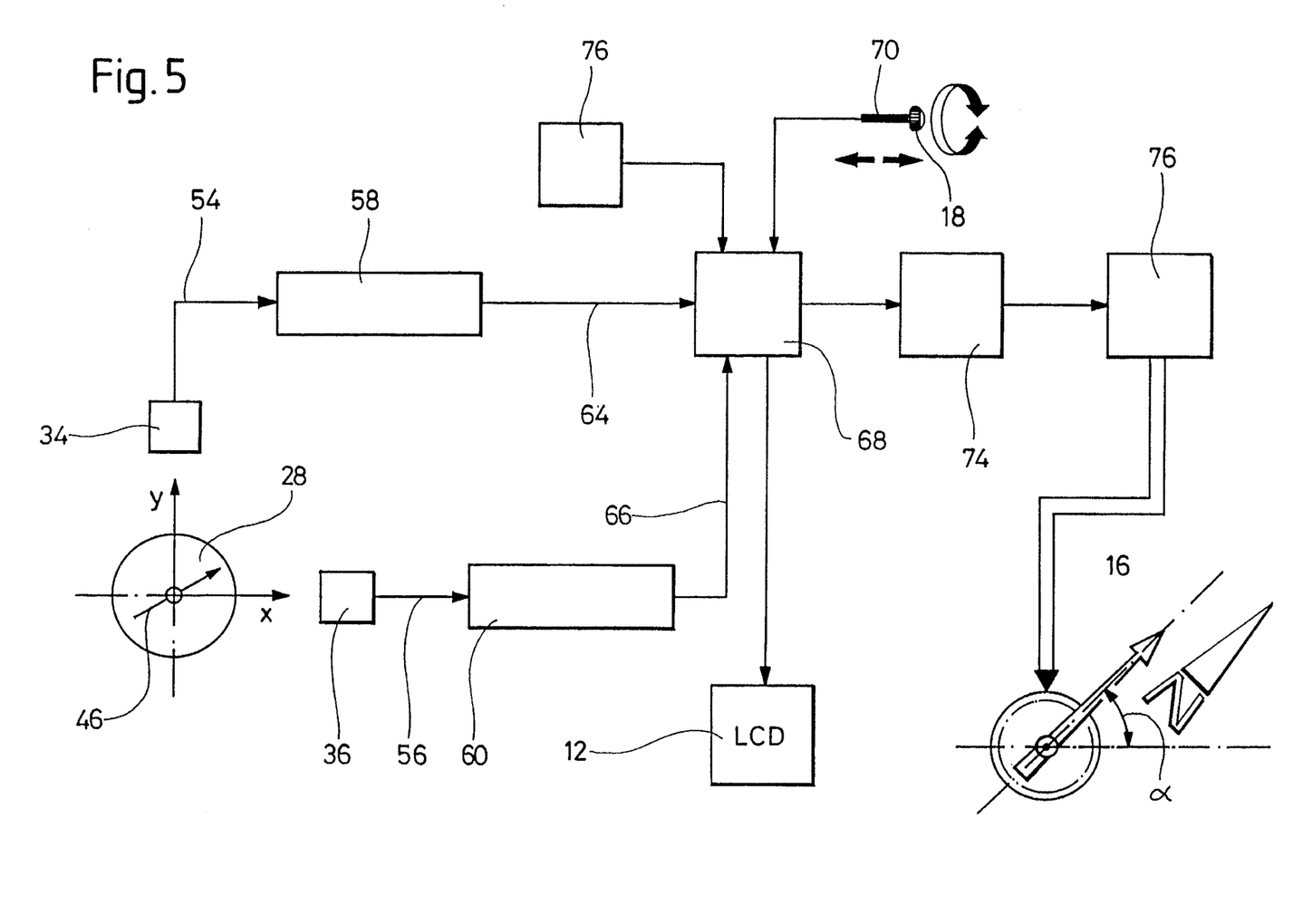
FIG. 5 is a general schematic of the arrangement of the first embodiment of the invention.

On FIG. 5 is shown the bipolar magnet 28 with its magnetic axis 46 and the two magnetic sensors 34 and 36 which respectively furnish a first detection signal 54 and a second detection signal 56 when a compass mode is activated. The detection signals 54 and 56 are respectively furnished to two processing units 58 and 60 arranged so as to furnish two useable detection signals 64 and 66 to an electronic management and control unit 68. The electronic unit 68 is arranged so as to calculate the direction of magnetic axis 46 of magnet 28 with the help of the two useable signals 64 and 66.

According to a variant embodiment the two processing units 58 and 60 are formed as a single common processing unit only, which is arranged in order to determine the angular orientation of the magnetic axis 46 of magnet 28 and to furnish an input signal representative of the angular orientation of the magnetic axis 46 to the electronic unit 68.

It is also provided that crown 18 is coupled to a rotatable stem 70, such rotatable stem being arranged within the watch in a manner to be able to furnish various electrical input signals to the electronic unit 68. Such rotatable stems are known to persons skilled in the art and are described for example in patent documents CH 632 894, EP 0 569 868 and CH 608 164. In the embodiment described here it is provided that the stem and the electrical contact means associated with such stem enable furn-ishing various information according to whether the stem is pressed in or drawn out relative to an intermediate neutral position and also by a rotation of such stem in one sense or the other.

The electronic unit 68 is arranged so as to control an LCD display 12 and an energy source 74 coupled electrically to a bi-directional motor 76 which is mechanically coupled to hand 16. Such hand 16 is used to indicate the hours or the indication of a preselected geographic direction. Here it will be noted that the minutes hand 14 can be chosen in an equivalent manner. Likewise, every other hand fitting out a watch according to the invention can be used for the indication of a preselected geographic direction when such watch is activated in a compass mode.

On FIG. 5, hand 16 indicates the direction of the geographic north. With the help of the rotatable stem 70, crown 18 operable by a user of the watch and the liquid crystal display 12, it is provided that a user can select any geographic azimuth whatsoever between 0° and 360° and can also introduce a magnetic declination corresponding to the magnetic declination of the place where the user is located. This will be described in further detail hereinafter with the help of FIG. 6.

Here it will be mentioned that every means for displaying a direction can be used for the indication of a preselected geographic direction according to the invention. Likewise, every means known to persons skilled in the art enabling the selection of an angle by a user can be used in other embodiment variations for the selection of the geographic azimuth and of the above-mentioned magnetic declination.

According to the invention, an information storage unit 76 is provided in which is memorized a correspondence table defin-ing, for a first plurality of angular positions of the magnetic axis 46 of magnet 28, a second plurality of respective angular positions. Each angular position of the second plurality determines the direction of the magnetic north when the magnetic axis 46 of magnet 28 is oriented along the respective angular position of the first plurality.

The angular separation between the position of the magnetic axis 46 and the corresponding direction of the terrestrial magnetic north has a value the magnitude of which depends on the perturbation generated by the magnetic masses contained in the watch, at the same time on the terrestrial magnetic flux in the region in which the magnet 28 is arranged and on such magnet 28 itself. As has been previously mentioned, magnet 28 is arranged in the watch in a manner such that the direct influence of the magnetic masses on such magnet is relatively weak, so that magnet 28 is basically oriented by the flux of the terrestrial magnetic field. However, a direct residual perturbation is practically inevitable and moreover the magnetic masses modify the distribution of the flow lines of the terrestrial magnetic flux.

It is necessary, in order to obtain a precise and reliable direction of the magnetic north or of any other magnetic azimuth, to determine the above-mentioned correspondence table for a plurality of different angular positions of the magnetic axis 46. For example, such table comprises 120 values corresponding to 120 consecutive separations of 3° of the magnetic axis 46. Thus, for every measured value of the angular position of the magnetic axis 46, the electronic unit 68 can determine, in the first plurality of angular positions memorized in unit 76, a value equal or close to the measured value and thus obtain the information on the real angular direction of the terrestrial magnetic north.

Figure 6:
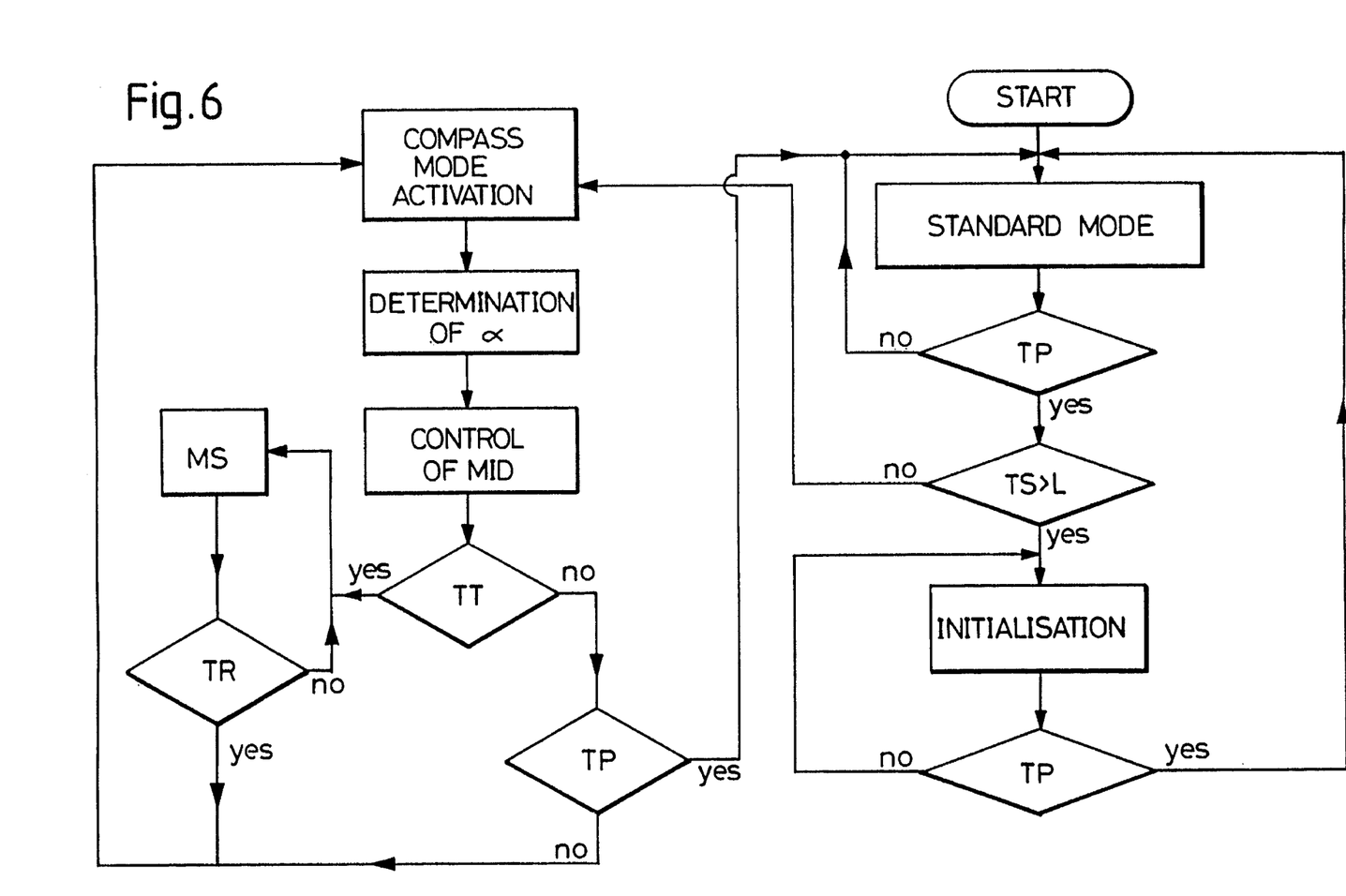
FIG. 6 ms a flow chart showing schematically the operation of the first embodiment of the invention.

With the help of FIG. 6, there will hereinafter be described briefly the principle of operation of the first embodiment of the invention. It will be noted that the principle of operation described hereinafter is not exhaustive and that several variants can be envisaged.

The watch is arranged to operate in a standard mode. In such standard mode, hands 14 and 16 indicate the user's local time of day. The liquid crystal display 12 can also, in such standard mode, indicate a time or any other useful information, in particular the date.

When the energization of the watch has been interrupted, in particular by a changing of the cell serving such energization, the capacity to initialize the position of hand 16 serving in particular for the indication of a preselected direction is provided. In order to enter the initialization mode, it is necessary to exert a pressure on stem 70 by means of crown 18 during a lapse of time TS greater than a defined limit value L. On FIG. 6, reference TP has been used to designate the action of pressing stem 70 axially, the reference TT to designate the action of axially withdrawing stem 70, the reference TR to designate the action of pressing stem 70 back into an intermediate neutral position.

In the initialization mode, the user brings hand 16 onto the 12 o'clock position for example, by means of crown 18. By a new pressure on stem 70, the angular position of hand 16 is furnished to electronic unit 68 which is arranged so as to take note of the angular position of hand 16 in time.

To activate the watch in the compass mode, it is provided to press on stem 70 during a time lapse TS less than the limit value L. When the compass mode is active, magnetic sensors 34 and 36 are energized and the electronic unit 68 calculates the angular position of the magnetic axis 46 of magnet 28 with the help of the useable detection signals 64 and 66. Next, with the help of the correspondence table memorized in unit 76, the electronic unit 68 calculates the angular position corresponding to the direction of the terrestrial magnetic north. Thereafter, such electronic unit 68 determines the angular position α relative to the center of rotation of hand 16 corresponding to the geographic azimuth introduced by the user of the watch in taking into consideration the magnetic declination, also introduced by such user.

Once the angular position α has been determined, the electronic unit 68 operates the energization 74 of the stepping motor 76 so as to align hand 16 on the angular direction α, such hand 16 then indicating the geographic direction preselected by the watch user according to the invention. In order to return to the standard operation mode, it is necessary to press once again on stem 70.

In order to modify the selection of the preselected geographic direction and of the magnetic declination of the locality of use of the watch, there is provided entry into a selection mode MS by drawing out stem 70. In the selection mode, the selection of a geographic direction will be brought about by rotation of stem 70 in a first sense which generates a run-past of selectable directions on the liquid crystal display 12. Likewise, in order to select a magnetic declination, the user actuates stem 70 in a second rotation sense, thereby generating a run-past of selectable magnetic declinations on display 12. In order to exit from the selection mode and return to compass operation, the user pushes stem 70 back into its intermediate neutral position.

In a first variant of the embodiment, it is possible to provide that the user select directly and solely a magnetic azimuth. In a second variant of the embodiment, in addition to the selection of the desired geographic direction, the determin-ation of the magnetic declination is brought about by means of a run-past on display 12 of cities, of regions or countries when the crown is driven in rotation in its second rotation sense and the watch is activated in the selection mode. After the user has selected the locality in which he is located on display 12, the electronic unit 68 determines the magnetic declination corresponding to said locality with the help of a second correspondence table in which is given, for each selectable city, region or country, the corresponding magnetic declin-ation. In this latter variant, there is provided a second information storage unit (not shown) in which said second correspondence table is memorized.

With the help of FIGS. 7 to 9, there will be described hereinafter a second embodiment of the invention as well as its principle of operation.

Figure 7:
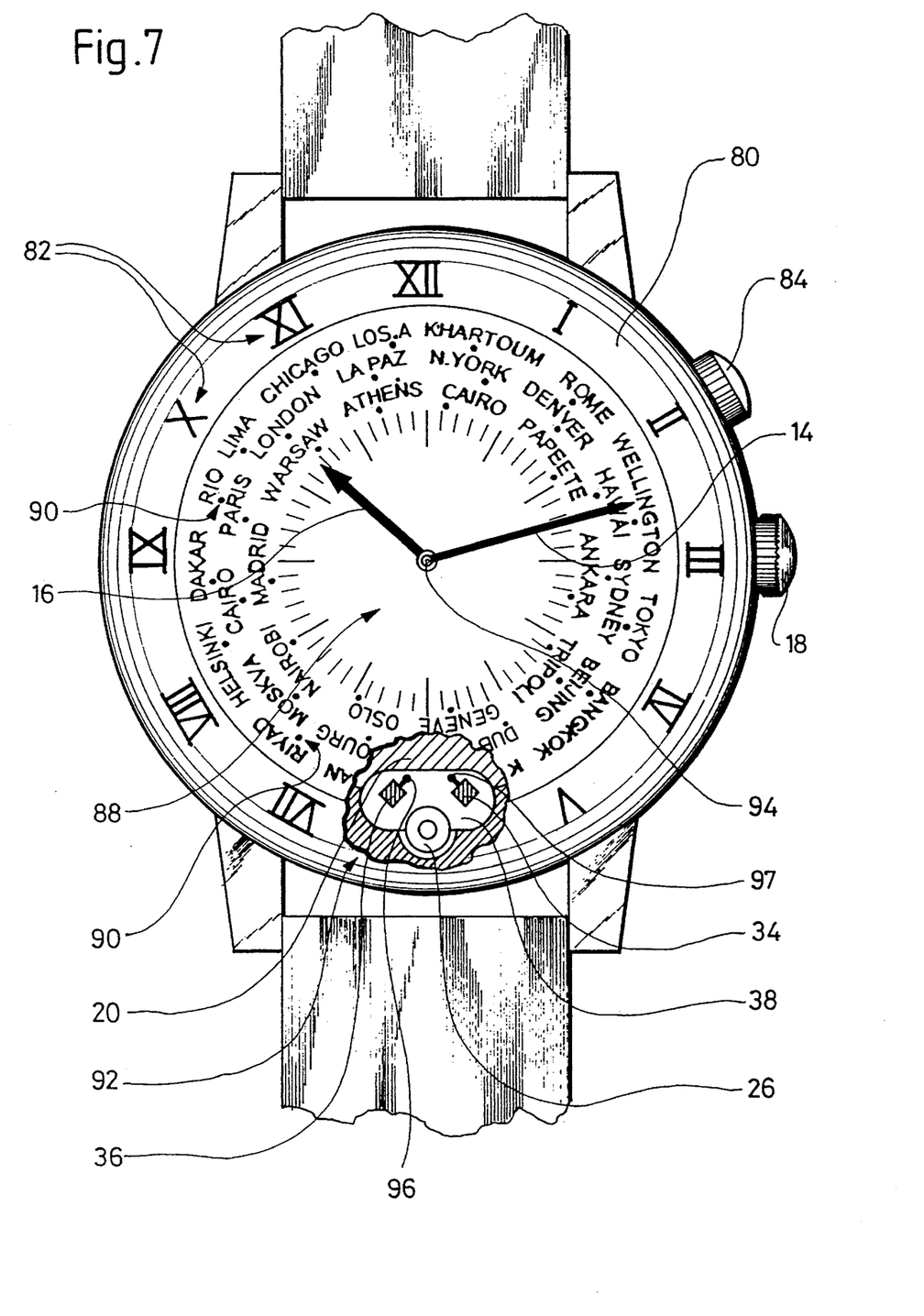
FIG. 7 is a top view of a second embodiment of a watch according to the invention, such view comprising a torn-away zone.

On FIG. 7, the watch comprises a fixed bezel 80 including time indicators 82. Such watch also comprises a crown 18 mechanically coupled to an axially operable rotatable stem 70, such stem 70 being similar to the stem described in the first embodiment. Furthermore, the watch includes a push-piece 84 and a dial 88 including several indicators 90 corresponding to a plurality of important cities, each inscribed proximate the respective indicator. The watch furthermore includes a minutes hand 14 and an hours hand 16.

The interior arrangement of the watch according to the second embodiment is similar to that of the first embodiment, such as described with the help of FIG. 2. In the torn-away zone 92, it will be noted that the arrangement of the magnetic sensors 34 and 36 is equivalent to that of the first embodiment, although they are angularly separated by an angle of 45° in order to permit an arrangement of cage 26, including the permanent magnet 28, separated as far as possible from the center 94 of the watch. It will be further noted that the substrate 38 on which sensors 34 and 36 are positioned exhibits a form different from that described in the first embodiment and that such substate 38 includes two metallized holes 96 and 97 permitting the establishment of an electrical connection with sensors 34 and 36 on the face of substrate 38 opposite the face on which are arranged sensors 34 and 36.

Figure 8:
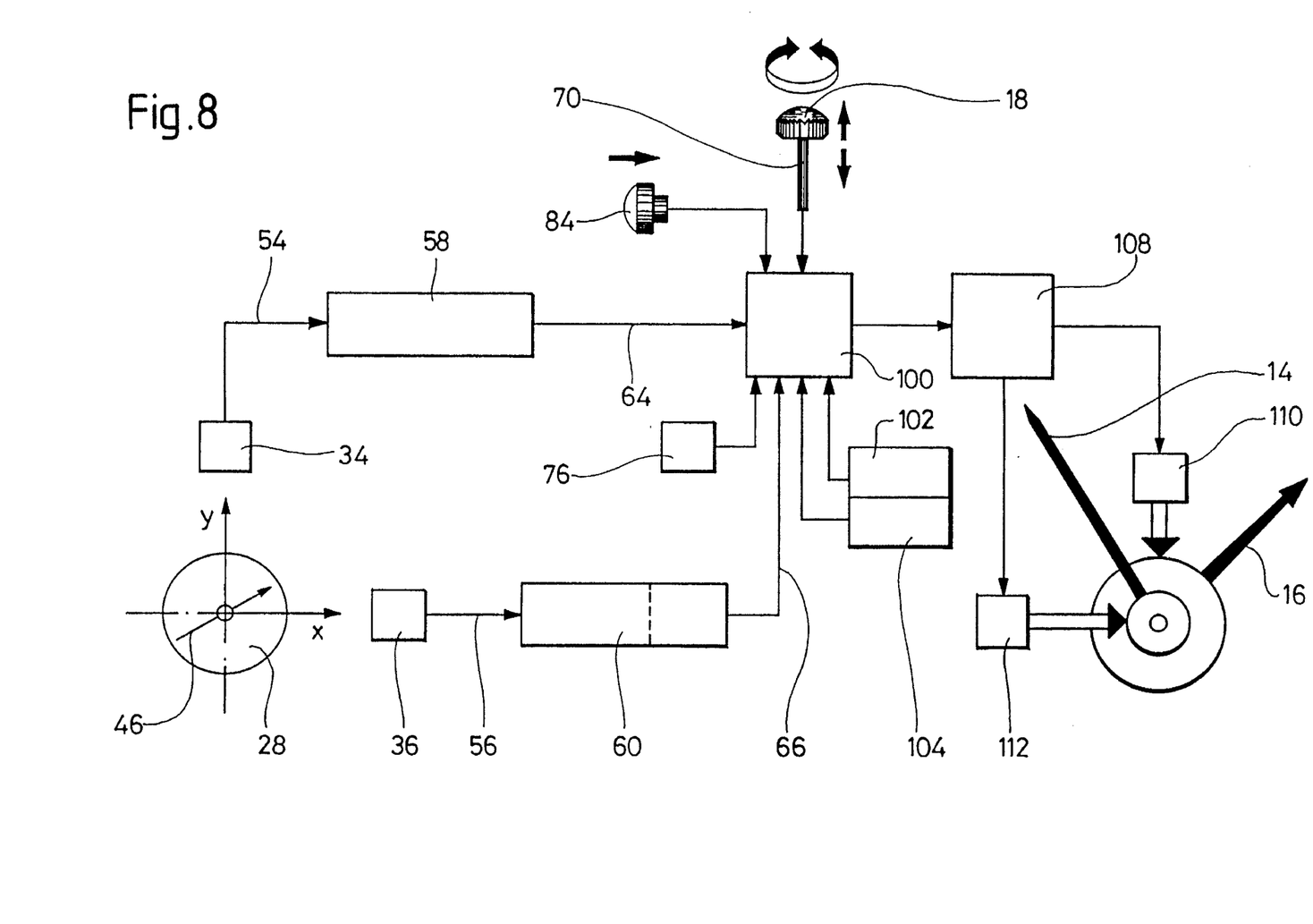
FIG. 8 is a general schematic of the arrangement of the second embodiment of the invention.
Figure 9:
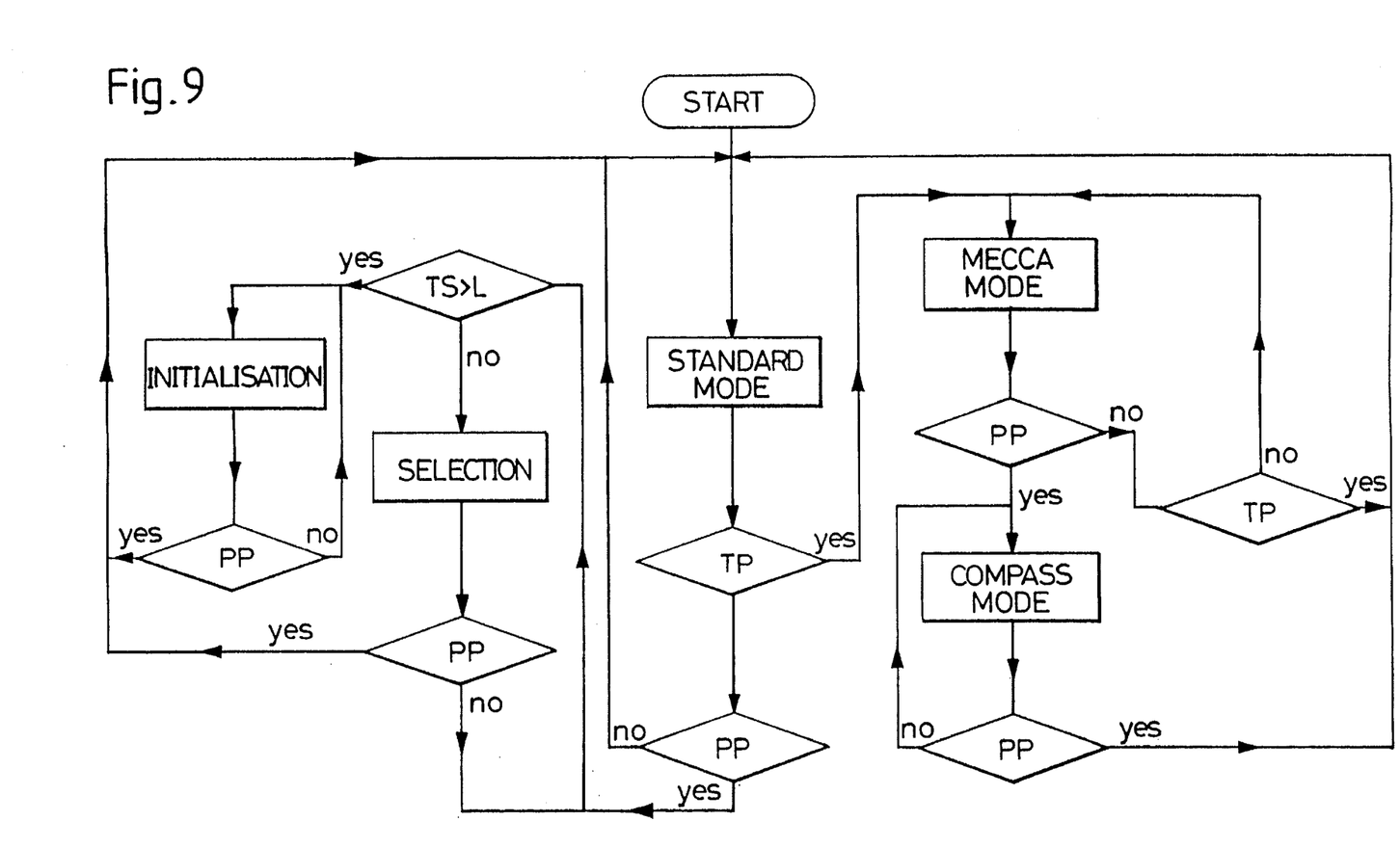
FIG. 9 is a flow chart showing schematically the operation of the second embodiment of the invention.

On FIG. 8 is shown schematically an arrangement of the second embodiment of the invention.

In a manner equivalent to the first embodiment, magnetic sensors 34 and 36 respectively furnish two detection signals 54 and 56 which are respectively processed by the processing units 58 and 60. Units 58 and 60 respectively furnish two useable detection signals 64 and 66 to an electronic management and control unit 100.

The electronic unit 100 is electrically coupled to the rotatable stem 70 fixed to crown 18 and to push-piece 84. Stem 70 and push-piece 84 are arranged in the watch case in a manner to be able to furnish control signals to the electronic unit 100 when such are actuated. As in the first embodiment, stem 70 furnishes various control signals when it is turned in one sense of rotation and in the other and also when it is axially pushed in or drawn outwardly. Push-piece 84 furnishes control signals to the electronic unit 100 when it is pressed by a watch user.

There is also provided a first information storage unit 76 including a first correspondence table, such as described in the first embodiment. The arrangement and operation of unit 76 will not again be described here in detail. Furthermore, there is provided a second information storage unit 102 in which are memorized the magnetic azimuths of a geographic locality pre-defined relative to a plurality of localities, of regions or of given countries corresponding to the plurality of indicators 90 provided on dial 88 of the watch (FIG. 7). Furthermore, there is provided a third information storage unit 104 in which the magnetic declinations of said plurality of localities, regions or countries are memorized.

The electronic unit 100 is arranged in order to determine the angular direction of the terrestrial magnetic north with the help of the detection signals 64 and 66 and of the first correspondence table memorized in unit 76. Such determination is effected in a manner analogous to the first embodiment described hereinbefore.

As will be described in further detail hereinafter, a watch user can select one of the cities inscribed on dial 88 by align-ing, while in a selection mode, the minutes hand 14 onto the corresponding indicator 90. The result of such selection is supplied to the electronic unit 100 which, with the help of unit 104, determines the magnetic declination of the locality selected by the user and corresponding substantially to that of the place in which he is located. Thereby, the electronic unit 100 is able to determine the direction of the geographic north with good precision.

Thus, in the compass mode of operation, hand 16 can correctly indicate the direction of the geographic north to the watch user. In order to do so, the electronic unit 100 controls an energization unit 108 which independently energizes a first bi-directional motor 110 and a second mono-directional or bi-directional motor 112. Motor 110 is mechanically coupled to the hours hand 16, while motor 112 is mechanically coupled to the minutes hand 14. As has already been mentioned, hands 14 and 16 in a standard mode enable the indication of the local time of day. In a selection mode, hand 14 serves to select a city among a plurality of cities indicated on dial 88. In a compass oper-ating mode, hand 16 serves to indicate the direction of the geographic north and, in an indicating mode of the direction of a predefined locality, in particular Mecca, such hand 16 serves to indicate such direction.

With the help of FIG. 9, there will be briefly described hereinafter the principle of operation of the second embodiment of the invention.

Reference TP is used in order to designate the action of pushing in stem 70, reference PP to designate the action of pressing on push-piece 84. In a standard mode, the watch is arranged so as to indicate the local time of day with the help of hands 14 and 16. When stem 70 is pushed in, a mode of indication of the direction of Mecca, designated as Mecca mode, is activated. In such Mecca mode, hand 16 indicates to the watch user the direction of Mecca, that is to say, the geographic azimuth of Mecca relative to the selected locality corresponding substantially to the place in which the watch user is located.

By pressing on push-piece 84, a compass mode is activated. In such compass mode, hand 16 indicates the direction of the geographic north as has already been described. By subsequently pressing on push-piece 84, the compass mode is discontinued and the standard mode is again activated. To exit from the Mecca mode, it is provided to press once again on stem 70.

There is further provided a selection mode and an initialization mode actuable with the help of push-piece 84. By pressure on such push-piece 84 during a time lapse TS greater than a limit value L, the initialization mode is activated. Such initialization mode enables the location of the angular position of the two hands 14 and 16. To accomplish this, the user brings such two hands 14 and 16 onto the position 12 o'clock for example, by an appropriate manipulation. In order to exit from the initialization mode, it is provided to press again on push-piece 84.

In order to enter into the selection mode, it is necessary to press on push-piece 84 during a time lapse TS less than the limit value L. In such selection mode, a city can be selected from among the plurality of cities inscribed on dial 88 and identified by means of the identifiers 90. The selection is brought about by an alignment of hand 16 on the identifier 90 corresponding to the city in which the user is located or to the closest city thereto among the plurality of cities indicated. In order to exit from the selection mode, a further pressure on push-piece 84 is necessary.

In the indication mode of the direction of Mecca, the electronic unit 100, with the help of the unit 102 in which are memorized the magnetic azimuths of the plurality of cities identified on dial 88, determines the angular direction corresponding to the direction of Mecca and controls the bidirectional motor 110 through the energization unit 108 in order that hand 16 indicate the correct direction of Mecca.

It will be noted that in this second embodiment of the invention, the watch possesses analog indicating and selecting means only.

Finally, it will be noted that either the indication of the direction of Mecca or the indication of the direction of geographic north is effected in real time in a manner such that the hand 16, serving as direction indicator, continues to point in the predetermined direction when the watch undergoes a rotation in the plane of dial 88. The angular direction of the magnetic axis 46 of magnet 28 is followed continuously in a reference marker XY fixed relative to the watch case. The algorithm for the calculation of the direction of the magnetic north corresponding to the angular position of the magnetic axis 46 is executed at a defined repetition frequency which can be elevated.

What we claim is:

1. A watch comprising:

an horological movement;

a case in which said horological movement is housed;

detecting means sensitive to the terrestrial magnetic field and including a bipolar permanent magnet rotatably mounted on a shaft arranged in said case so as to rotate freely around a predetermined rotation axis, said magnet having a magnetic axis substantially perpendicular to said rotation axis, and at least a first sensor and a second sensor arranged within said case and sensitive to the magnetic field of said magnet, said first and second sensors respectively furnishing first and second detection signals;

means for indicating a geographic direction;

electronic means for controlling said indicating means as a function of said first and second detection signals which are processed by said electronic means in a manner to determine the angular position of said magnetic axis of said bipolar magnet;

magnetic masses; and a first information storing unit in which a correspondence table is memorized, defining for a first plurality of angular positions of the magnetic axis of said magnet a second plurality of respective angular positions, each angular position of the second plurality determining the direction of the terrestrial magnetic north whenever the magnetic axis of said magnet is oriented according to the respective angular position of the first plurality of angular positions, the angular spread between the position of said magnetic axis and the corresponding direction of the terrestrial magnetic north having a value the magnitude of which is a function of the perturbation generated by said magnetic masses of said watch on the terrestrial magnetic flux in the region in which said permanent magnet is arranged and on said magnet itself.

2. A watch as set forth in claim 1, said magnet being located in a peripheral region of the case exterior of said horological movement.

3. A watch as set forth in claim 1 or in claim 2, in which said magnet is arranged within said case at a distance sufficient from said magnetic masses in order that its minimum energy position is basically determined by the terrestrial magnetic flux.

4. A watch as set forth in claim 1, said first and second sensors being formed by two Hall probes arranged on a common substrate fixedly positioned relative to a cage in which said magnet is housed, such cage having two bearings in which the two ends of said shaft are respectively freely mounted.

5. A watch as set forth in claim 4, wherein said cage exhibits an external bearing surface on which said substrate is arranged in cantilever, said first and second sensors being located in a plane perpendicular to said rotation axis of said magnet, such first and second sensors being located at the same distance from said axis of rotation and having an angular separation of 90° relative to such axis of rotation.

6. A watch as set forth in claim 1, wherein the values of the angular positions of said second plurality are experimentally determined with the help of an unperturbed master compass and means for detecting the angular position of said magnetic axis of said magnet arranged within the case of said watch.

7. A watch as set forth in claim 1, further comprising first selection means arranged to furnish a first control signal to said electronic means, these latter responding to such first control signal in order to determine a magnetic azimuth selected by a user of said watch and defining said geographic direction indicated by said indicating means when such indicating means are activated in a compass mode.

8. A watch as set forth in claim 1 comprising first selection means arranged to furnish a first control signal and a second control signal to said electronic means, such latter responding to the first control signal in order to determine a geographic azimuth selected by a user of said watch and to said second control signal in order to determine a magnetic declination also selected by a user of said watch, said electronic means being arranged so as to determine a corresponding magnetic azimuth and to drive said indicating means to a geographic direction in a manner that such indicated geographic direction corresponds to said geographic azimuth whenever a compass mode is activated.

9. A watch as set forth in claim 8, wherein said first selection means comprise a rotatable stem operable by a watch user by means of a crown fixedly coupled to said stem and further comprise display means enabling said watch user to select said geographic azimuth by a rotation of said crown in a first sense and said magnetic declination by a rotation of said crown in a second sense.

10. A watch as set forth in claim 8, further comprising two second selection means in order to select a locality or a geographic region from amongst a plurality of given localities or given geographic regions.

11. A watch as set forth in claim 10, said second selection means comprising a hand operable by the user of the watch by means of a crown, and a dial comprising a plurality of indications on its surface corresponding respectively to said plurality of localities or given geographic regions, said hand being adapted to be aligned on each of said plurality of indications in order to enable the selection of the corresponding locality or geographic region.

12. A watch as set forth in claim 10 or in claim 11, further comprising a second information storing unit in which are stored the magnetic azimuths of a geographic locality, predefined relative to said plurality of given localities or geographic regions, said electronic means being arranged to drive said indicating means to a geographic direction in a manner that such direction corresponds to said predefined geographic locality whenever an indication mode of such predefined locality is activated and the watch user is located substantially within said locality or said selected geographic region.

13. A watch as set forth in claim 10 or claim 11, comprising a third information storage unit in which the magnetic declinations of said plurality of localities or geographic regions are stored, said electronic means being arranged to drive said indicating means in a geographic direction in a manner that such direction corresponds to a geographic azimuth selected by a user of said watch, or to the geographic north whenever a compass mode is activated and the user of such watch is located substantially within the locality or selected geographic region.

14. A watch as set forth in claim 1, comprising a time indicating mechanism including at least one hand driven by a bidirectional motor and means for initializing such hand in order to furnish an initial angular position of the hand to said electronic means, such electronic means being arranged to follow the angular position of said hand in real time when the watch is maintained in operation, said hand belonging to said means for indicating a geographic direction and serving to indicate visually such direction to a user of said watch.

15. A watch as set forth in claim 12, comprising a third information storage unit in which the magnetic declinations of said plurality of localities or geographic regions are stored, said electronic means being arranged to drive said indicating means in a geographic direction in a manner that such direction corresponds to a geographic azimuth selected by a user of said watch, or to the geographic north whenever a compass mode is activated and the user of such watch is located substantially within the locality or selected geographic region.

* * * * *